United States Patent [19]

Thornburg

[11] 4,313,113
[45] Jan. 26, 1982

[54] CURSOR CONTROL

[75] Inventor: David D. Thornburg, Los Altos, Calif.

[73] Assignee: Xerox Corporation, Stamford, Conn.

[21] Appl. No.: 133,365

[22] Filed: Mar. 24, 1980

[51] Int. Cl.³ .............................................. G06F 3/14
[52] U.S. Cl. .............................. 340/709; 340/365 A; 178/18
[58] Field of Search .............. 340/365 A, 709, 365 R; 178/18-20

[56] References Cited

U.S. PATENT DOCUMENTS

| 3,503,031 | 3/1970 | Nyhus et al. | 340/365 A |
| 3,974,493 | 8/1976 | de Cavaignac | 340/709 |
| 4,044,642 | 8/1977 | Pearlman et al. | 340/365 A |
| 4,091,234 | 5/1978 | Bristow | 178/18 |
| 4,148,014 | 4/1979 | Burson | 340/709 |

Primary Examiner—Marshall M. Curtis

Attorney, Agent, or Firm—Serge Abend

[57] ABSTRACT

A graphic input device for controlling the movement of a cursor upon a visual display. The device includes a number of variable resistance pressure transducers corresponding to the primary orthogonal directions of cursor movement. Each pressure transducer comprises a first electrode for selecting the direction of movement and a second electrode spaced from the first electrode, one of the electrodes being made of an electrically resistive elastomeric material. A manipulable force transmitting device is provided to move the electrodes toward one another and into contact, the contact area being variable with the force applied, so that the resistance across the electrodes is high when the contact area is small and lower when the contact area is larger. The device is connected to the visual display via an electrical circuit which supplies signals to move the cursor in a selected direction at a speed inversely proportional to the resistance condition.

1 Claim, 10 Drawing Figures

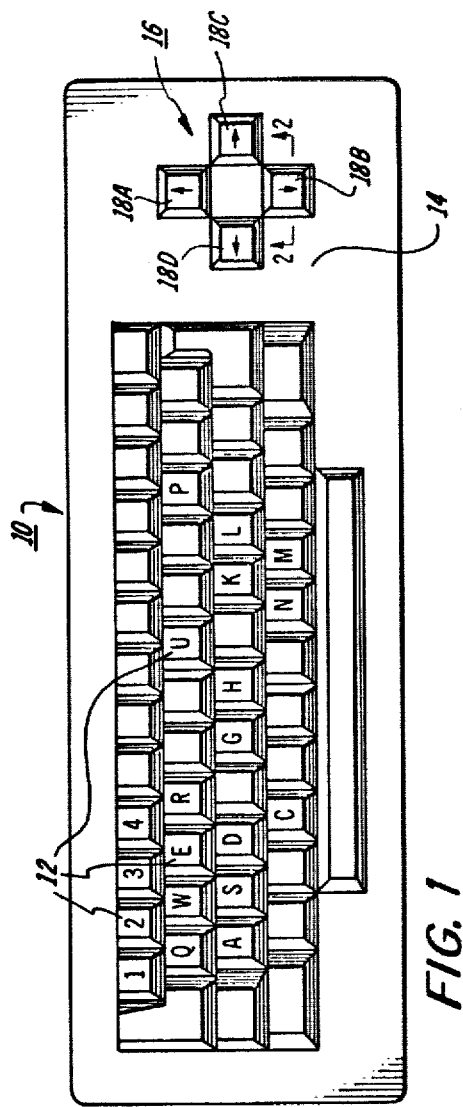
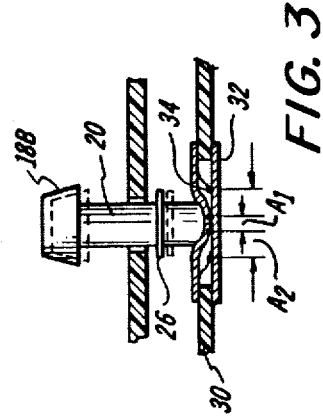
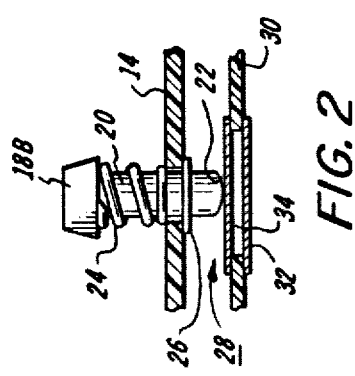

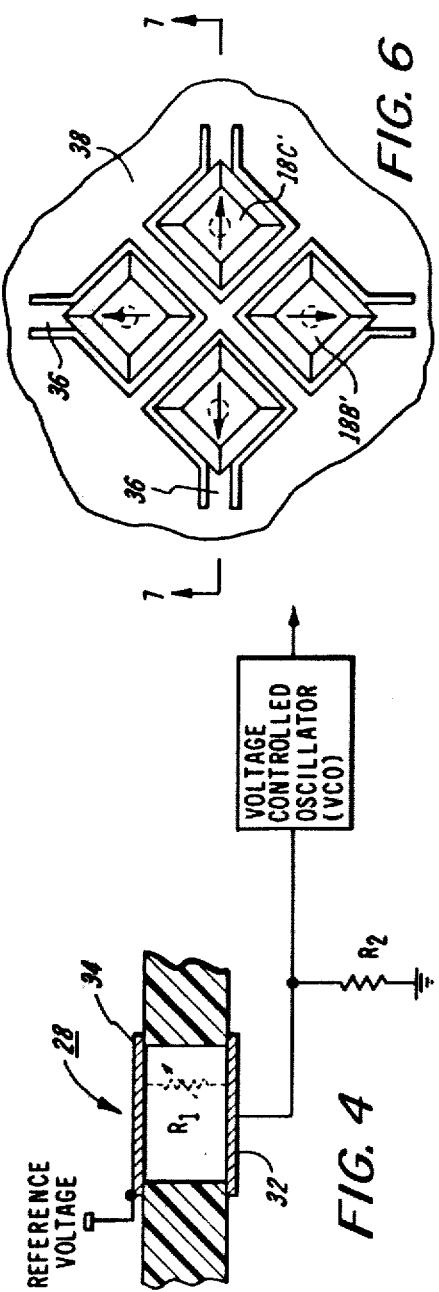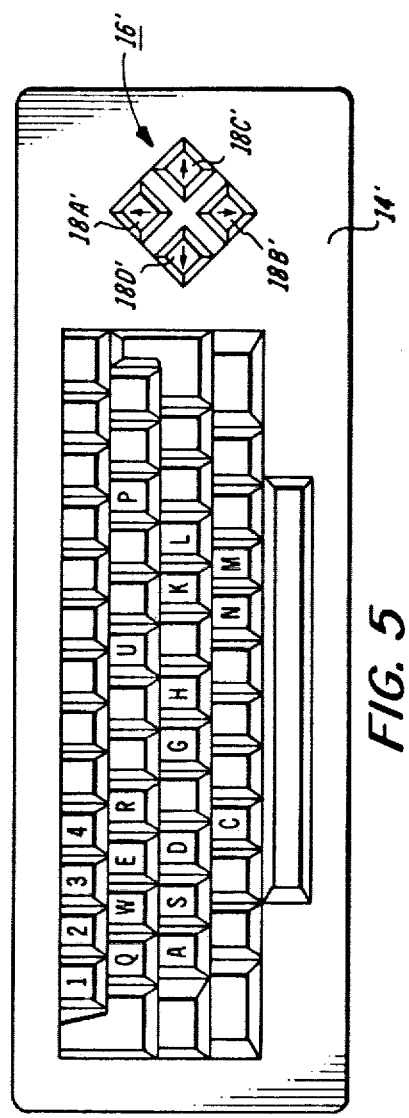

CURSOR CONTROL

This invention relates to a graphic input device for controlling the movement of a cursor upon a visual display.

In soft display computer terminals and word processing systems it is often necessary to provide some method for locating and identifying a position on the visual display. Most commonly, a cathode ray tube (CRT) is provided, upon which full page format alphanumeric or graphic information is displayed, as directed by an operator. When the operator desires to alter the displayed information, the location of the information to be modified must be identified. For example, if a word, sentence or string of text is to be deleted, the operator must accurately indicate the beginning and end of the deletion. Or, if it is desired to insert information, the exact location of the insert must also be indicated. This has been accomplished by moving a caret or arrow, commonly known as a cursor, over the CRT display and arresting it at the desired location. Movement of the cursor may also define the location of points to be displayed in a graphical pattern.

Several types of position indicating devices are in use in information display systems. For example, in word processing systems there are on-keyboard devices utilizing dedicated or shared keys. The keys control cursor movement in an incremental manner in the [ ↑, ↓, →, ←] UP, DOWN, RIGHT and LEFT directions. Another on-keyboard device is the capacitive touch activated transducer pad of U.S. Pat. No. 4,103,252 assigned to the same assignee as the instant invention.

There are also off-keyboard housings responsive to manipulated position changes over a planar surface or tablet, such as taught in U.S. Pat. No. 3,541,541, U.S. Pat. No. 3,835,464 and U.S. Pat. No. 3,987,685 the latter two patents also assigned to the same assignee as the instant invention. Another class of well known cursor position indicating devices utilizes a tablet for supplying an output signal indicative of position upon the CRT display in response to movement thereupon of a pen-like stylus or even the operator's finger. Examples of this type of device are to be found in U.S. Pat. No. 3,567,859, U.S. Pat. No. 3,959,585 and U.S. Pat No. 4,129,747.

Yet another approach to cursor positioning allows the operator to point directly at the selected location on the CRT display. These devices incorporate CRT overlays such as the transparent conductive grid touch panel device of U.S. Pat. No. 4,085,302 and the light grid panel of U.S. Pat. No. 3,673,327.

It should be readily apparent that most of the known solutions are of complex construction and are, therefore, relatively expensive to manufacture. The least expensive systems incorporate the on-keyboard dedicated keys. These have a decided advantage, in the word processing environment, of being compact and avoiding desk clutter in a busy office setting. However, as presently commercially known in a four key [ ↑, ↓, →, ←] orthogonal cursor control device, it is generally necessary to depress a selected key for each increment of cursor movement in one of the four indicated directions, a decidedly burdensome task. An improved variation is known wherein a repeat function has been introduced. By depressing the selected key continuously, the cursor will initially move one increment in the selected direction and, after a suitable delay of, for example, one half second, the cursor will repeat its incremental motion, in the same direction, at a fixed, predetermined rate.

The cursor control device of the present invention overcomes the above set forth limitations and disadvantages of the described known devices. It is constructed of only a few inexpensive elements, resulting in low manufacturing costs, and it is easy to operate. In operation, the speed of cursor travel on the CRT display may be varied simply by the application of more or less pressure upon the improved control device. Also, the cursor may be moved in other than the four orthogonal directions since composite cursor movement vectors are made possible by suitable manipulation of the device. Thus, once the operator gains proficiency with this device, the cursor may be moved rapidly and directly to the desired location.

The present invention comprises a cursor control device comprising a plurality of variable resistance pressure transducers having coordinate electrode means spaced from cooperating electrode means at least one of the elecrode means being in the form of an electrically resistive elastomeric material. A manipulable force transmitting device is provided to move the electrodes toward one another initially into mere, small area, contact and subsequently as pressure is increased, into intimate, large area, contact. When the contact area is small, a high resistance condition is seen across the electrode means and when the contact area is larger a lower resistance condition is seen across the electrode means. The cursor control device is connected in a suitable electrical circuit which supplies signals to move the cursor on the CRT display in a selected direction at a slow speed when the high resistance condition is present and at a higher speed in the selected direction as the resistance condition is lowered.

A more complete understanding of the invention and its advantages may best be understood by reference to the following description taken in conjunction with the accompanying drawings.

Referring to the drawings:

FIG. 1 is a plan view of a standard keyboard modified to incorporate one form of the cursor control device of the present invention;

FIG. 2 is a sectional view taken substantially along line 2—2 of FIG. 1 showing, in further detail, one of the cursor control keys;

FIG. 3 is a sectional view similar to that of FIG. 2 showing the result of applying varying pressure to the cursor control key;

FIG. 4 shows a circuit in which the cursor control keys may be connected;

FIG. 5 is a plan view of a standard keyboard modified to incorporate an alternative embodiment of the cursor control device of the present invention;

FIG. 6 is an enlarged plan view of the keys comprising the alternative cursor control device with the keyboard bezel having been removed;

Figure 7:
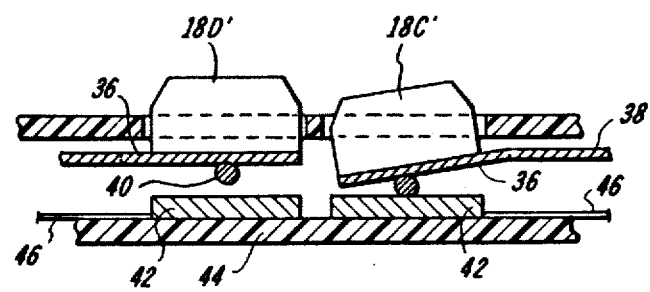
FIG. 7 is a sectional view taken substantially along line 7—7 of FIG. 6.

On the standard keyboard 10 of FIG. 1 there is disclosed a plurality of well known keys 12 for selecting alphanumeric symbols and control functions. The keys overlie a protective bezel 14 below which known switch connections are made. The cursor control device 16 of this invention is shown positioned on the right side of the keyboard. It comprises four dedicated keys, 18a–d, whose keytops may bear legends [↑, ↓, →, ←] indicating UP, DOWN, RIGHT and LEFT directions of cursor movement.

Each of the keys 18 comprises a keytop from which depends a plunger 20 having a rounded end 22. The plunger passes through an opening in the keyboard bezel 14 against which it is biased upwardly by a suitable spring 24, having been selected to provide the desired resistance against downward pressure. A retainer 26, in the form of a pin or C-clip, insures that the key 18 does not become displaced. Below each of the keys is a variable resistance pressure transducer 28, each including an electrically insulating substate 30 having an opening therein, with a rigid electrically conductive electrode 32 and an electrically resistive elastomeric electrode 34 secured to the bottom and top surfaces of the substrate 30 over the opening.

In FIG. 2 the key 18b has not been depressed and the electrodes are spaced. In FIG. 3 two conditions are shown. First, low pressure manual application on the keytop causes the rounded end 22 of the plunger 20 to deform the elastomeric electrode 34 to the extent that it barely touches conductive electrode 32 over contact area $a_1$. Second, upon further application of manual pressure to the keytop, the contact area between electrodes 32 and 34, identified as $a_2$, is increased. The resistance, measured by an ohmmeter across the electrodes 32 and 34, varies with the application of pressure to the keytop which causes a variation in the area of contact ($a_1$, $a_2$, etc.) therebetween. If desired, the rigid conductive electrode 32 may be replaced by a second electrically resistive elastomeric electrode backed by a rigid support. The material of choice, of which the resistive elastomeric electrode 34 is fabricated, is a carbon loaded polyolefin. Such a material is commercially available as Wescorp #W-5001 sheeting.

Each of the four variable resistance pressure transducers 28 may be connected, as shown in FIG. 4, in an electrical timing circuit which produces output pulses at a rate inversely proportional to the varying resistance $R_1$ across the corresponding transducer. A reference voltage is applied to the elastomeric electrode 34 and the conductive electrode 32 is connected to ground, through a resistance element $R_2$, and to a voltage controlled oscillator (VCO). For consistency of electrical schematic representation, the pressure transducer has been shown in phantom as a variable resistance element. When the control key has not been depressed, no output pulses will be generated. As manual pressure is applied to a selected keytop, pulses will be generated at a rate in proportion to the contact area ($a_1$, $a_2$, etc.) between the electrodes 32 and 34. The output pulse rate will increase as the manual pressure and contact area is increased. Suitable circuitry may be incorporated in the CRT system, to which this device may be connected, to increment the cursor on the visual display by one step for each pulse.

In use, the operator may depress more than one key in order to obtain a composite vector of cursor travel. This feature is a decided advantage over the one-step key devices heretofore used. Once proficient in manipulating the cursor control device of this invention, the operator may rapidly and accurately position the cursor with minimum effort.

In the embodiment illustrated in FIGS. 5–7, the keyboard 10′ supports a modified cursor control device 16′ also comprised of a set of four keys 18a′–18d′. The keys of this alternative embodiment are positioned in a diamond pattern with the keytops secured to electrically conductive cantilever keysprings 36 which, as shown, have been cut out of a sheet 38 of conductive material underlying the keyboard bezel 14′.

Secured to the lower wall of each keyspring 36 is a contact electrode in the form of a spherical metal ball 40. Spaced from each contact electrode is an electrically resistive elastomeric electrode 42 supported upon an insulating substrate 44. Each elastomeric electrode controls cursor movement in an orthogonal direction and carries suitable contact leads 46 for connecting the elastomeric electrodes to an electrical circuit similar to that described with reference to FIGS. 1–4. It should be apparent that an alternative form of this device could include the use of a rigid bottom electrode and an elastomeric ball.

In operation, each variable resistance pressure transducer is in a normally open condition with no current path from the top electrode 40 to the bottom electrode 42. When the keytop is depressed, the spherical ball 40 will make initial contact with the elastomeric electrode 42 over a small area, thus providing a high resistance electrical path across the electrodes. As the key is depressed still further, more of the surface area of the ball is brought into contact with the elastomeric electrode and the resistance of the current path is reduced still further.

Manipulation of this form of the invention by the operator has decided advantages over known keyboard devices. The unique cantilever key mounting and the diamond configuration positions the apexes of the keys close together. Thus, by placing a single finger at the apex junction, a single key or two keys, simultaneously, may be depressed with varying degrees of pressure, as desired. If the manipulating finger is considered to be a "joy-stick", the ease and simplicity of operation can easily be comprehended.

Figure 8:
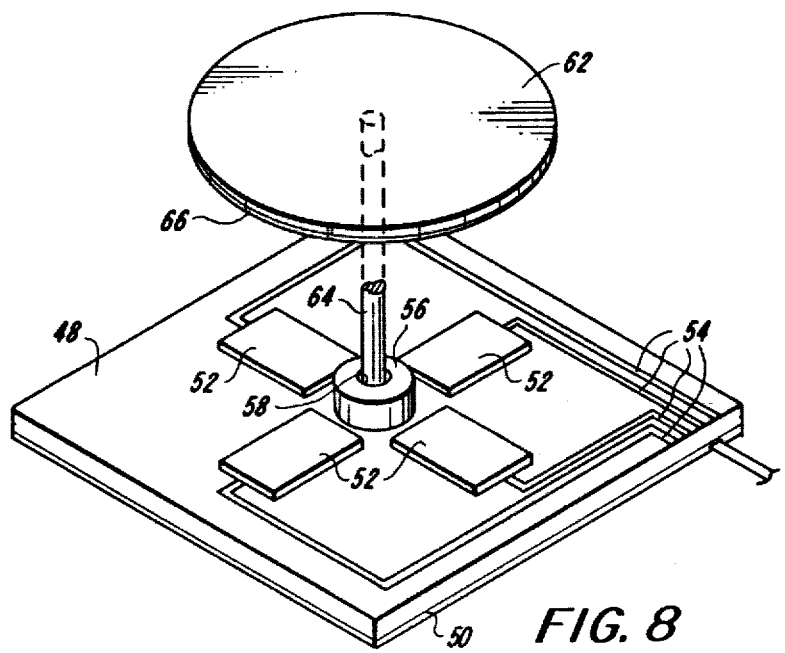
FIG. 8 is a perspective view of yet another alternative embodiment of the cursor control device of this invention.
Figure 9:
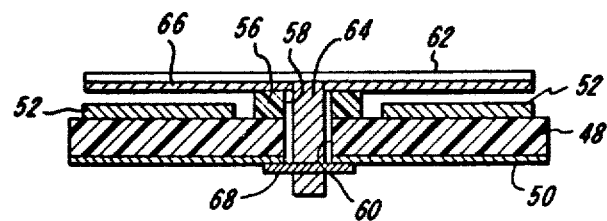
FIG. 9 is a sectional view of the alternative embodiment of FIG. 8.
Figure 10:
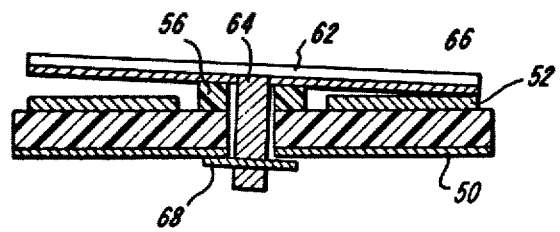
FIG. 10 is a view similar to that of FIG. 9 showing contact being made for moving the cursor.

A third configuration of this invention is illustrated in FIGS. 8–10. In this embodiment, the cursor control device is in the form of a wobble plate arrangement which may be located upon a standard keyboard in the place of the key operated devices illustrated in FIG. 1 or FIG. 5. Of course, the device may be utilized as an offkeyboard device if so desired. The base of the devices comprises a two sided insulating circuit board 48 bearing conductive foil 50 on its bottom surface, to which suitable leads may be connected. A conductive foil, etched into four coordinate electrodes 52 with connecting leads 54, is supported on its top surface. The circuit board supports a flexible insulating spacer 56 having a central opening 58 coaxial with a central opening 60 in the circuit board. A wobble plate 62 with an axial conductive stud 64 depending therefrom has at least a bottom conductive surface in contact with the stud. If desired, the entire plate 62 may be conductive. Secured to the conductive lower surface is an electrically resistive elastomeric electrode layer 66 coextensive with the wobble plate. Layer 66 may also be made of Wescorp #W5001 sheeting. The combined wobble plate assembly is then mounted upon the etched circuit board 46 as shown in FIGS. 9 and 10 with the elastomeric electrode layer 66 resting on the insulating spacer so as to be slightly spaced from the coordinate electrodes 52. A conductive retainer 68 holds the wobble plate 62 in place and is in intimate electrical contact with the conductive foil 50. In this way, the conductive foil 50 on the bottom of circuit board 48 is maintained in constant electrical contact with the exposed surface of the elastomeric electrode 66.

In operation, the operator manipulates the wobble plate, upon which suitable markings have been affixed to indicate the four orthogonal directions of cursor travel [ ↑, ↓, →, ←]. Off-axis application of pressure to the plate 62, causes the spacer to deform, to allow the elastomeric electrode 66 to contact one or two of the coordinate electrodes 52. The application of light pressure will yield a small area of contact between the selected coordinate electrode or electrodes 52 and the elastomeric electrode 66 yielding a resultant high resistance path between the selected coordinate electrode 52 and the bottom conductive foil 50. As this pressure is increased, the area of contact between the elastomeric electrode and the coordinate electrode will be increased, yielding a further reduced resistance. In this fashion, by connecting the cursor control device to suitable circuitry as described above, signals indicating direction and magnitude can be simultaneously produced from this variable resistance pressure transducer.

The wobble plate device may be housed beneath the keyboard bezel (not shown) with the upper surface of the plate protruding slightly above the plane of the keyboard. A flexible cover sheet secured on the keyboard bezel overlying the wobble plate will protect the cursor control device while allowing the operator to manipulate it with ease.

It should be understood that the present disclosure has been made only by way of example, and that numerous changes in details of construction and the combination and arrangement of parts may be resorted to without departing from the scope and the spirit of the invention as hereinafter claimed.

What is claimed is:

1. A graphic input device for controlling the movement of a cursor upon a visual display, characterized by including,
   variable resistance pressure transducer means including four sets of switches, each controlling cursor movement in one of four orthogonal directions and comprising,
   first electrode means, including a resistive elastomeric pad, for selecting the direction of movement of the cursor, and
   second electrode means, including a spherical contact, spaced from said first electrode means,
   one of said first or second electrode means being mounted for movement upon a cantilever spring arm,
   force transmitting means, associated with and overlying each of said switches and comprising four finger actuable keys arranged in a diamond pattern with the free ends of said underlying cantilever spring arms meeting at the center of the diamond, for actuating said transducer means by moving said cantilever spring arms so as to vary the electrical resistance across said first and second electrode means in an inverse relationship to the applied pressure, and
   circuit means connecting said variable resistance pressure transducer means to said visual display for moving the cursor in a selected direction at a slow speed when a high resistance condition is present and at a higher speed in the selected direction as said resistance condition is lowered.

* * * * *